No. 756,722. PATENTED APR. 5, 1904.
G. B. SIMMONS & J. R. WHORTON.
CORN OR COTTON PLANTER.
APPLICATION FILED SEPT. 4, 1903.
NO MODEL. 3 SHEETS—SHEET 1.
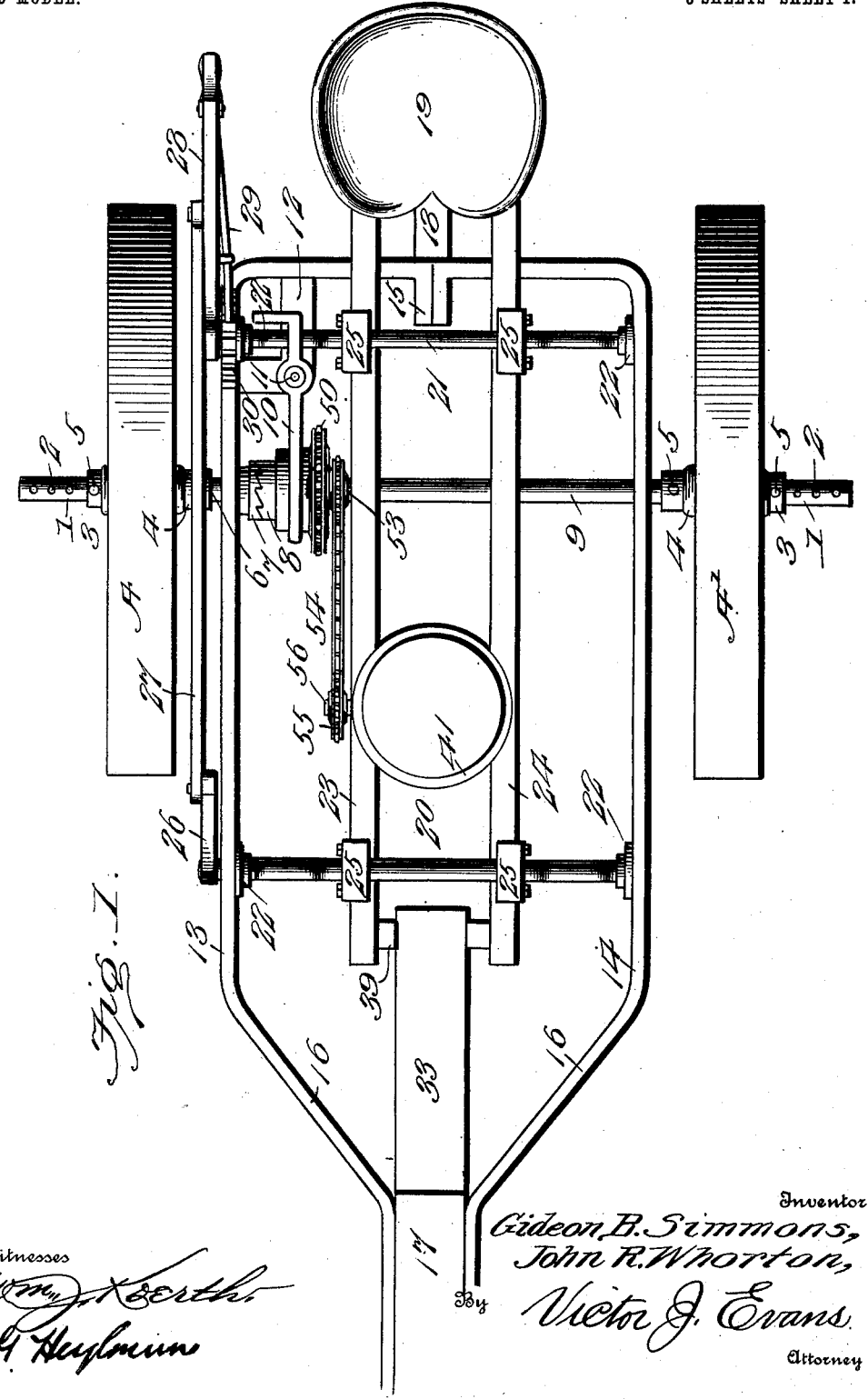
Witnesses
Inventors
Gideon B. Simmons,
John R. Whorton,
By Victor J. Evans
Attorney

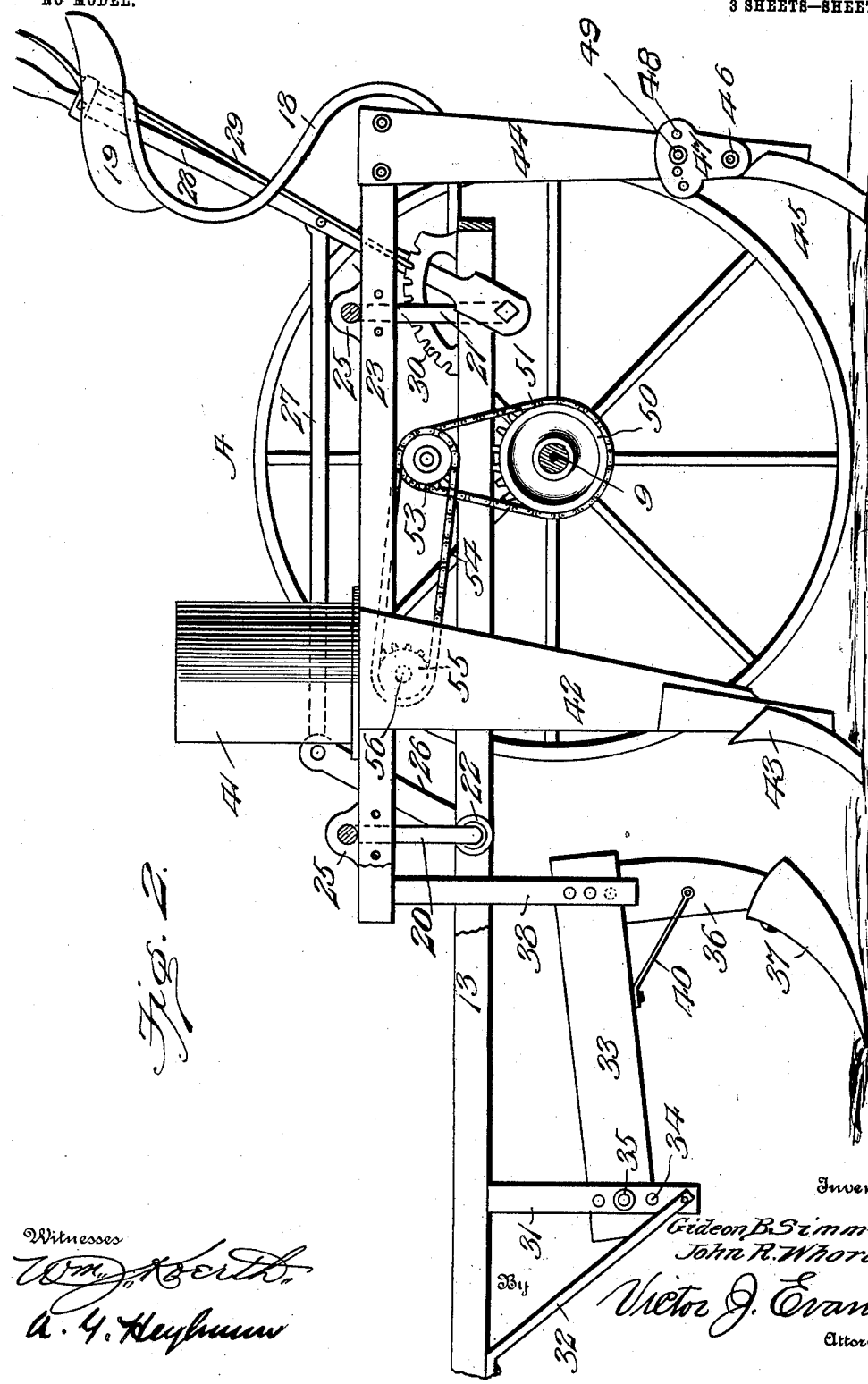

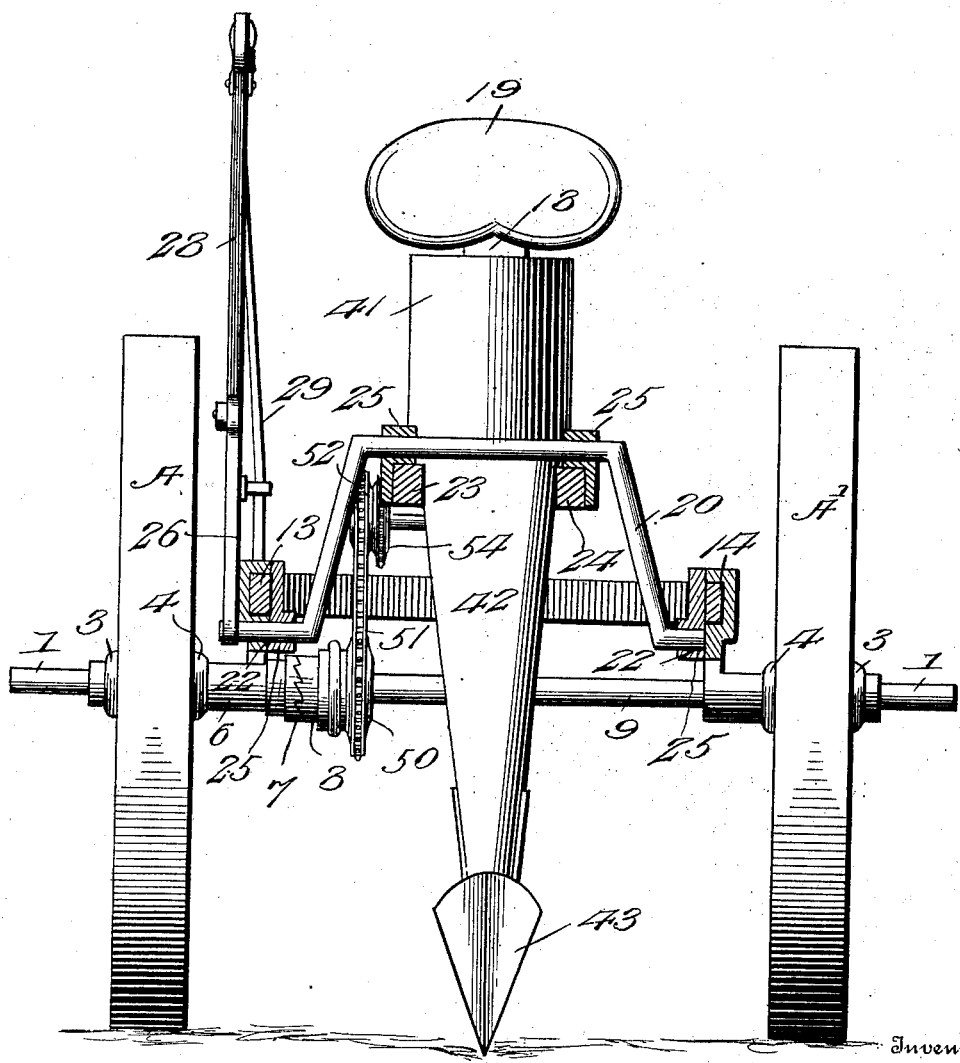

No. 756,722. Patented April 5, 1904.

UNITED STATES PATENT OFFICE.

GIDEON B. SIMMONS AND JOHN R. WHORTON, OF DALLAS, TEXAS.

CORN OR COTTON PLANTER.

SPECIFICATION forming part of Letters Patent No. 756,722, dated April 5, 1904.

Application filed September 4, 1903. Serial No. 171,997. (No model.)

*To all whom it may concern:*

Be it known that we, GIDEON B. SIMMONS and JOHN R. WHORTON, citizens of the United States, residing at Dallas, in the county of Dallas and State of Texas, have invented new and useful Improvements in Corn or Cotton Planters, of which the following is a specification.

Our invention has relation to improvements in corn and cotton planters.

The present improvements are particularly devised as betterments to that certain machine shown and described in Letters Patent No. 692,646 granted to C. L. Ferriott, dated February 4, 1902, for improvements in corn or cotton planters; and the objects are to improve and simplify the means for adjusting the position of the plows and seed-dropper, to improve the frame construction, and in general to simplify and improve the whole machine, as will be hereinafter fully specified and the asserted novelty particularly pointed out and distinctly claimed.

We have fully and clearly illustrated our improvements in the annexed drawings, to be taken as a part of this specification.

Reference being had to the drawings, Figure 1 is a plan view of the complete machine. Fig. 2 is a view in side elevation, partly in longitudinal vertical section. Fig. 3 is a vertical cross-section taken through the frame of the machine on a line in front of the box or hopper and the seed-spout.

A A' designate the wheels of the machine, which may be of any approved construction and of such breadth in tread of tire and of such diameter as will suit them to carry the machine and enable it to travel over the soil without serious impediment. The axle on which the wheels are mounted is made in two parts, with a clutch mechanism between them, and the spindles 1 are lengthened to extend beyond the hubs of the wheels, and in the extensions is made a series of holes 2, so the wheels may be set or adjusted at different positions on the spindles to accommodate the wheels and the machines to rows of different widths apart. To effect these adjustments, movable collars 3 4 are arranged on the spindles provided with pin-holes, and linchpins 5 are passed through the collars and through the spindle. It will be seen that by moving the collars as desired and the hubs to suit the wheels may be adapted to suit the action of the plows to the rows. The spindle of the part 6 of the two-part axle is held against turning in the hub and is formed with a clutch member 7 on its inner end, which engages with a slidable clutch member 8, mounted loosely on the inner end of the axle part 9. It is apparent that the wheel-axle may be in a single piece and held in the hubs to turn with both of the wheels and one clutch member being fixed to the axle and the other slidable on the axle into and out of clutched engagement. In the hub of the movable clutch member is made the usual annular groove wherein is arranged the ring or fork of a clutch-lever 10, fulcrumed on a pin 11 in a bracket 12, secured at a convenient place to the frame.

Carried by and secured to the axle is the main frame, consisting of strong flat metal side bars 13 14, set on edge and arranged parallel with each other for such distance as may be required and at such distance apart as to suit the purposes intended. At the rear the bars of the frame are turned at right angles to the side pieces and meet at the middle of the frame, where they are secured together, as at 15. At the front portions the side bars are directed inward, as at 16, and then carried straight and parallel with each other, as indicated, and between these straight parts is secured the rear end of the tongue 17. To the rear end of the frame is secured a suitable spring standard or support 18, to the upper end of which is secured the driver's seat 19, so positioned that his weight will substantially balance that part of the machine extending in front of the axle. The main frame is held relatively stationary in its position.

20 21 designate two crank-axles disposed at the front and rear portions of the main frame, substantially as shown. These crank-axles have their ends pivotally supported in bearings 22, secured to the side rails of the main frame, and have the arms of the bails of a length to adjust the frame which they carry to the position in elevation which may be desired.

23 24 designate suitable rails or bars pivotally mounted on the cross-bars of the bails of the cranks by means of bearings 25. The journals of the crank-shafts are extended through the side rail of the main frame at one end, and on the front journal is fixed one end of a lever-bar 26, to the upper end of which is connected a pitman 27, the outer end of which is connected to a lever 28, the lower end of the lever being fixed to the journal of the rear crank-axle. The lever 28 is provided with a spring-controlled pawl 29, which engages in a sector-rack 30, secured to the rail of the main frame. It will be perceived that by operating the lever 28 the bails of the crank-axles will be moved to lower or higher position and that whatever elements carried by the bars or rails 23 24 will correspondingly be raised or lowered and that by means of the pawl and sector-rack the parts may be held in the position to which they have been adjusted.

To the tongue at its rear portion, rigidly secured, is the upper end of a depending vertical standard 31, braced in position by a brace-bar 32, and to the standard 31 is pivotally connected a plow-beam 33, also made vertically adjustable in its connection to the standard by means of a series of holes 34, through any one of which the pivot-pin 35 may be placed. The beam 33 extends to the rear the requisite distance, substantially as shown, and has firmly attached to its inner end the plow-standard 36, carrying on its lower end the plow 37, constituting the furrow opener or marker which forms and lines out the furrow into which the seeds are dropped. The free end of the beam 23 is adjustably secured in the lower end of the depending standard 38, having its upper end fixed in a cross-bar 39, secured between the front ends of the rails 23 24, as indicated in Fig. 1 of the drawings. A brace-rod 40 holds the plow-standard firmly in position.

41 designates the seed-hopper mounted on and secured to the rails 23 24 and having the seed-spout 42 extending downward from its bottom, and to the lower end of the seed-spout is secured a shoe 43, behind which the seeds fall into the furrow. To the rear end of the rails 23 24 is secured the upper end of the standard of the seed and furrow coverer 44, which adjustably carries on its lower end the covering-plow 45, mounted on a pivot-pin 46 and made adjustable thereon by a plate 47, provided with plurality of pin-holes 48, through which a pin 49 passes into or through the standard, substantially as shown. On the axle of the wheels is mounted a driving-sprocket 50, on which is a chain 51, carried about a sprocket-wheel 52 on the movable member of the clutch. On this member is a smaller sprocket-wheel 53, on which is a chain 54, carried about a sprocket-wheel 55, mounted on a shaft 56, which is the shaft of the seed-dropping mechanism.

It may be stated that the seed-dropping mechanism may be of any approved selected type and character and the general construction of the plows may also be such as will serve the purposes intended, since the construction of these parts does not enter into the novelty involved and any suitable appliances of these kinds may be substituted for those illustrated.

The operation of the invention may be stated as follows: It will be perceived that, as shown, the points of the plows and the seed-spout approximate a common horizontal line, and it is the province of the adjusting mechanism to move them all simultaneously to higher or lower lines. To accomplish this as may be desired, all that is necessary is to move the lever 28 the required distance and lock it in such position.

Having thus described our invention, what we claim is—

In a planter of the character described, the combination of a lower stationary frame, crank-axles journaled in the frame, an upper vertically-movable frame pivotally mounted on the bails of the axles, a plow secured to and depending from the forward end of the movable frame, a plow secured to and depending from the rear end of the movable frame, a seed-hopper on the movable frame intermediate the plows, a seed-spout depending therefrom, a lever-arm on the journal of the forward axle, a lever on the journal of the rear axle, a pitman connecting the lever-arm and the lever, and means to hold the lever in a set position, substantially as described.

In testimony whereof we affix our signatures in presence of two witnesses.

GIDEON B. SIMMONS.
JNO. R. WHORTON.

Witnesses:
  E. P. BURNETT,
  W. L. FARGASON.